Jan. 21, 1958  J. T. CORNILLAUD  2,820,531
BRAKE ADJUSTING DEVICE
Filed Oct. 11, 1956  2 Sheets—Sheet 1

INVENTOR.
Jack T. Cornillaud
BY
HIS ATTORNEY

Jan. 21, 1958   J. T. CORNILLAUD   2,820,531
BRAKE ADJUSTING DEVICE
Filed Oct. 11, 1956   2 Sheets—Sheet 2

INVENTOR.
Jack T. Cornillaud
BY
HIS ATTORNEY

United States Patent Office 2,820,531
Patented Jan. 21, 1958

2,820,531

BRAKE ADJUSTING DEVICE

Jack T. Cornillaud, Dearborn, Mich., assignor to General Motors Corporation, Detroit, Mich., a corporation of Delaware Application October 11, 1956, Serial No. 615,412

10 Claims. (Cl. 188—79.5)

This invention relates to a brake for a motor vehicle, and particularly to a drum type brake having cooperating internal expanding shoes provided with a brake shoe applying device between adjacent cooperating ends of the shoes and an adjusting device between opposite cooperating ends of the shoes.

Because of various operating conditions of a brake and conditions of the brake mechanism, shoe type brakes have a tendency to produce an objectionable audible squeak or squawk. It has been determined that the brake shoes develop a frequency of vibration that creates the objectionable noise, the shoes being the resonant members that respond to a vibration frequency.

It is therefore an object of this invention to effect a tuning of the resonant frequency out of the audible range.

In this invention the tuning of the brake shoes to raise the resonant frequency to change the vibration is occasioned by the use of a spring having a changeable spring rate that responds to brake applying forces in a manner that as the brake applying force increases the spring rate of the spring will increase and thereby effect a change in the resonant frequency of vibration of the shoes to raise the frequency out of the audible range.

It is an object of this invention to provide a variable rate or changeable rate spring in the adjusting device provided between adjacent cooperating ends of the shoes, the rate of the spring being at one value under low brake applying force and being of a substantially higher value at high brake applying force, the spring also being adapted to engage a stop that limits the maximum deflection of the spring so that when brake applying forces have reached a predetermined maximum value there will be provided a rigid connection between the shoes through the adjusting device including the spring.

It is another object of the invention to provide a brake having a variable rate spring between the brake shoes arranged in a manner that the change in rate of the spring can be varied gradually through a predetermined rate change, or the spring can have the rate change made in steps of specific rate change to effect either a gradual change in the resonant frequency of vibration of the brake shoes or have the resonant frequency of vibration changed in predetermined steps of frequency change, either one being made in response to an increase of brake applying forces.

Further objects and advantages of the present invention will be apparent from the following description, reference being had to the accompanying drawings wherein a preferred form of the invention is clearly shown.

Figure 1:
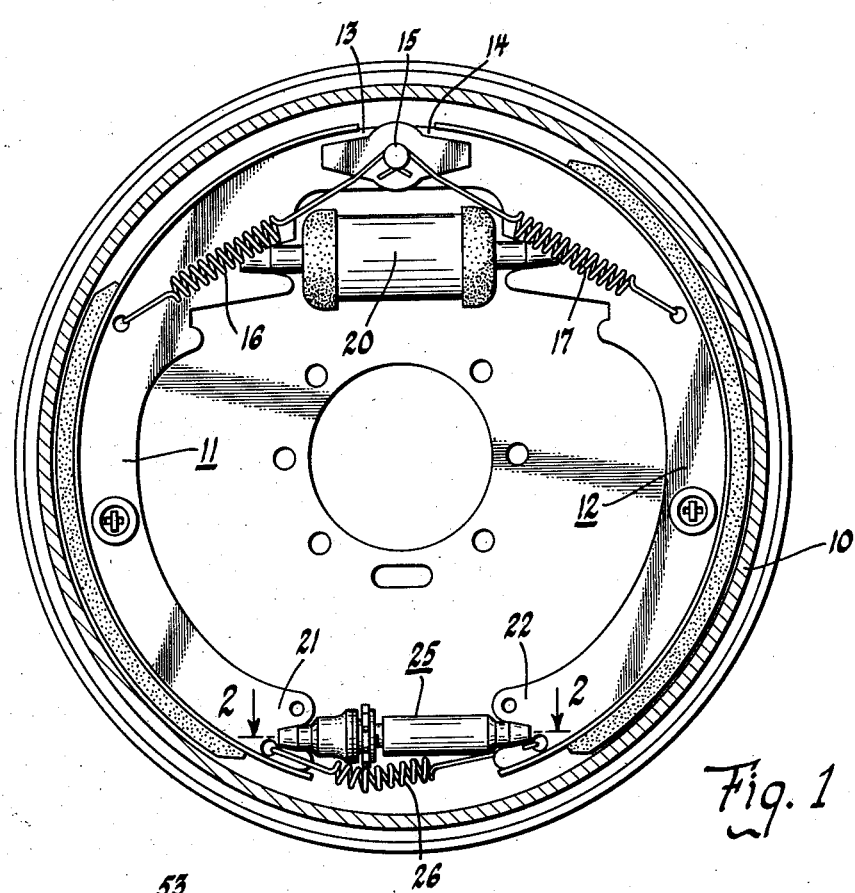
Figure 1 is a cross sectional view of a drum and shoe type brake with parts of the brake in elevation and incorporating features of this invention.

In this invention the brake consists of a drum 10 within which there is located the brake shoes 11 and 12. The upper cooperating ends 13 and 14 of the brake shoes engage an anchor pin 15. The ends 13 and 14 of the brake shoes are held in engagement with the anchor pin 15 by means of retraction springs 16 and 17 respectively. A force applying device 20 of a hydraulic brake system is placed between the brake shoes 11 and 12 adjacent the anchor pin 15 to effect movement of the brake shoes into engagement with the brake drum. The force applying device 20 is a conventional wheel cylinder of a conventional hydraulic brake system.

Opposite adjacent ends 21 and 22 of the brake shoes are connected by an adjusting device 25 that is placed between the shoes, the ends 21 and 22 being held in engagement with the adjusting device by the spring 26.

The brake herein described is a conventional duo-servo type of brake, the operation of which is well known and understood in the art.

Because of many variable operating conditions of the brakes such as the rate of deceleration, atmospheric conditions, the application force on the shoes, the condition of the surfaces of the brake lining and of the brake drum, there is created in the brake vibrations that develop certain frequencies. It has been determined that the brake shoes are the resonant members that create the resultant audible squeak or squawk from the brake. The frequency of vibration of the brake, and particularly the resonant frequency of the brake shoes is not the same under all brake loading conditions, or brake force applying conditions. Under low loading conditions the frequency of vibration may be at a relatively low level giving rise to a low pitch squawk in the audible range whereas when the brake applying forces become relatively high the frequency of vibration rises and gives rise to a more high pitched squeak.

It has been found that when a resilient member is placed between adjacent cooperating ends of the brake shoes, the frequency of vibration of the shoes is so altered that the noise occasioned during application of the brakes become inaudible. However, if the resilient member has a single spring rate sufficient to raise the frequency of vibration of the shoes to eliminate a low pitched squawk, it will not normally eliminate the high pitch squeak. In this invention therefore a resilient spring member is placed between adjacent cooperating ends of the brake shoes in an arrangement wherein the spring rate of the spring is altered as the brake applying forces increase and thereby raise the resonant frequency of vibration of the brake shoes to retain the frequency of vibration out of the audible range when the brake applying forces are either in the range of low values or in the range of high values.

Figure 2:
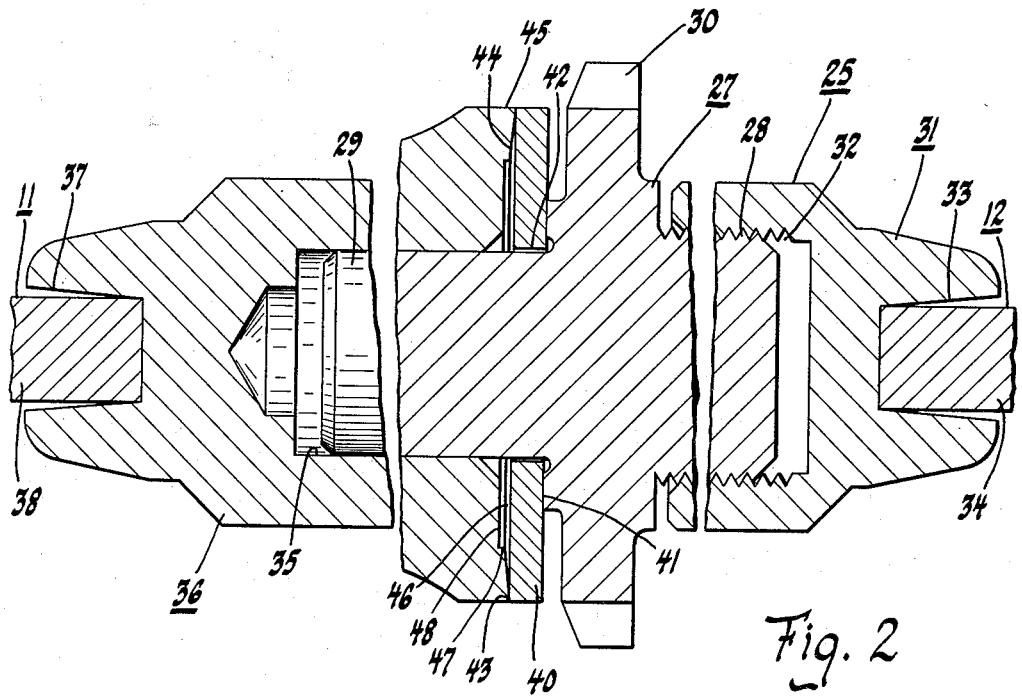
Figure 2 is a cross sectional view of the adjusting device for the brake taken along line 2—2 of Fig. 1 incorporating the feature of this invention.

In this invention the variable rate spring that effects the change in vibration frequency of the brake shoes is incorporated in the adjusting device 25, as more particularly illustrated in Figure 2.

The adjusting device 25 consists of an adjusting screw 27 that has a threaded end portion 28 and a smooth surfaced cylindrical end portion 29. The radical flanged portion 30 has the edges serrated for engagement with the spring 26 normally to resist rotation of the screw 27.

The end portion 28 is threadedly received in an internal threaded bore 32 of a support member or sleeve 31 that engages the brake shoe 12 the end of the support member 31 having a notch 33 that receives the web 34 of the brake shoe 12. Thus a support member or sleeve 31 is held non-rotatable relative to the web of the brake shoe 12.

The smooth surface cylindrical portion 29 of the adjusting screw 27 is received in a smooth cylindrical bore 35 provided in a support member or sleeve 36 that has the notch 37 in the end thereof that engages the web 38 of the brake shoe 11 and thereby holds the support member or sleeve 36 nonrotatable relative to the brake shoe 11.

A resilient spring 40 is placed between the support members 31 and 36, the spring being in the form of a flat washer or ring that has an initial spring rate depending upon factors of hardness and thickness of the ring. The flange portion 30 of the adjusting screw has an annular protruding surface 41 that engages the spring ring at or near the inner periphery 42 of the ring. The support member 36 is provided with a lip 43 that engages the spring ring on the opposite face thereof at or near the outer periphery of the ring. The lip 43 is formed by the juncture between the angular face 44 and the outer peripheral surface 45 of the support member 36, the angular face 44 being part of a recess 46 formed in the support member 36.

The angular annular face 44 terminates at a shoulder 47 that is generally coaxial with the axis of the support member 36, the shoulder terminating in a radial surface 48 that forms the remaining portion of the wall of the recess 46.

With the brakes in normal released or retracted position, the variable rate spring ring 40 is in the position illustrated in Fig. 2 so that the support member 36 is resiliently connected with the support member 31 through the spring ring 40 and the adjusting screw 27 so that under initial application of light brake pressure the initial or primary spring rate of the spring ring is that which is effective for resiliently connecting the support members 36 and 31. The spring rate of the spring 40 is determined basically by the ratio of the internal diameter of the ring to its external diameter.

This initial spring rate, or primary spring rate of the spring 40 is established at a level sufficiently high that the resonant frequency of the brake shoes at low brake loading or under low brake applying forces is above the audible frequency range at the low frequency noise level. That is, the spring rate is sufficient to change the frequency of the brake shoes to above the low frequency squeak of the brakes created under low brake applying forces.

As the brake applying forces increase, and the brakes are effected with a higher loading, a transition in the spring rate of the spring 40 is accomplished by deflection of the spring axially of the screw 27 so that the outer portion of the spring flattens against the surface 44 with the result that the shoulder 47 becomes the effective radial diameter of the spring that establishes a new and second ratio of the inner diameter of the washer to its outer diameter with the result of effecting a higher spring rate in the spring. This increase of spring rate decreases the resiliency between the supporting members 36 and 31 with the result that the resonant vibration frequency of the brake shoes is raised considerably above that of the first mentioned position of the spring 40. In fact the resonant frequency is again carried beyond the audible range to eliminate the undesirable squeak at high brake loadings.

In the event of a "panic stop" by the operator of the vehicle, that is one involving a sudden emergency with absolute maximum brake loading applied instantly, the inner diameter of the spring 40 will engage the wall surface 48 of the support member 36 and thereby limit the maximum deflection of the spring 40 and at the same time provide an absolutely rigid connection between the support members 31 and 36 and thereby between the brake shoes so that extreme loading of the brakes can be occasioned during the emergency condition.

Figure 3:
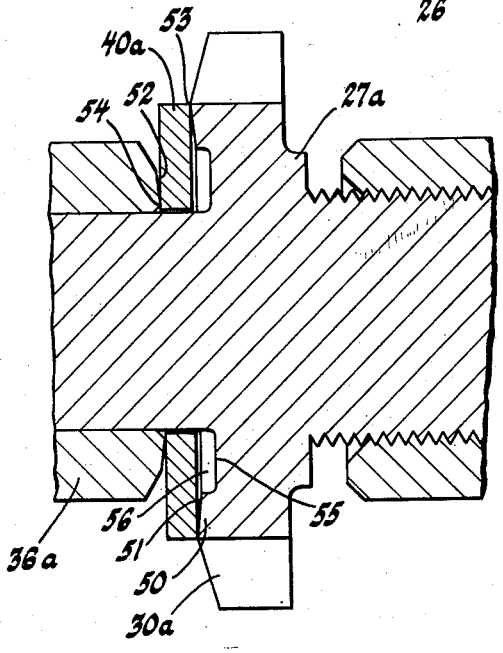
Figure 3 is a partial cross sectional view of an adjusting device like that of Fig. 2 but illustrating a modified arrangement of the changeable rate spring for the device.

In Figure 3 there is illustrated a structure comparable to the structure of Fig. 2 but wherein the faces engaged by the changeable rate spring are modified to provide for deflection of both inner and outer diameters of the spring relative to the faces engaged at the respective diameters.

In Fig. 3 the flange member 30a of the adjusting screw 27a is provided with the annular raised portion 50 provided with a face 51 disposed at about a 5° angle to a true radius line. Similarly, the support member 36a is provided with an annular face 52 disposed at about a 5° angle relative to a true radial line. Thus the face 51 provides for a line contact 53 at the outer periphery of the spring ring 40a while the angularly disposed face 52 provides for a line contact 54 at the inner periphery of the spring ring 40a. The face 55 of the recess 56 provides a stop for the inner diameter of the spring ring 40a when it is flexed to a predetermined degree under panic stop conditions as previously described.

The operation of the device of Fig. 3 is substantially the same as that of the device of Fig. 2 except that the annular angular faces 51 and 52 provide for concurrent deflection at the inner and outer diameters of the spring ring.

Figure 4:
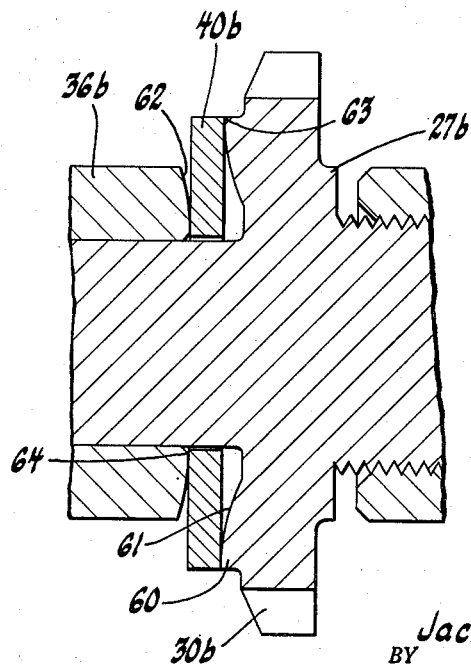
Figure 4 is a partial cross sectional view of an adjusting device similar to that of Fig. 2 but illustrating another modified arrangement of the changeable rate spring device.

In Fig. 4 there is a further modified arrangement of the structure wherein the flange 30b of the adjusting screw 27b has an annular raised portion 60 provided with an arcuately curved surface 61. Similarly, the support member 36b has an annular surface 62 arcuately curved. The surfaces 61 and 62 provide line contacts 63 and 64 with the spring ring 40b. The arcuately curved surfaces 61 and 62 provide for a gradual change in the spring rate as the brake application forces increase as distinguished from the specific step increase in the spring rate effected by the structures of Figs. 2 and 3.

While the form of embodiment of the invention as herein disclosed constitutes a preferred form, it is to be understood that other forms might be adopted as may come within the scope of the claims which follow.

What is claimed is as follows:

1. In a brake comprising a drum and shoes engageable therewith and having applying means at one end of the shoes and adjustable connecting means between opposite ends of the shoes with a variable rate spring in the connecting means resiliently transmitting brake applying forces between the shoes to change the vibration frequency of the brake shoes as the brake applying forces increase.

2. A brake comprising a drum and shoes engageable therewith and having applying means at one end of the shoes and adjustable connecting means between the opposite ends of the shoes with a spring in the connecting means resiliently transmitting brake applying forces between the shoes and having a changeable rate spring that increases rate as the brake applying forces increase to change the vibration frequency of the brake shoes as the brake applying forces increase.

3. A brake comprising a drum and shoes engageable therewith and having applying means at one end of the shoes and adjustable connecting means between the opposite ends of the shoes with a spring in the connecting means resiliently transmitting brake applying forces between the shoes and having a changeable spring rate that increases rate as the brake applying force increases to change the vibration frequency of the brake shoes as the brake applying forces increase, said spring engaging a stop on the connecting means which controls maximum deflection of the spring and effects thereby a rigid connection between the brake shoes at a predetermined brake applying force.

4. A brake comprising a drum and shoes engageable therewith and having applying means at one end of the shoes and adjustable connecting means between opposite ends of the shoes having a rotatable screw member connected to one of the shoes and a support member connected to the other shoe with a variable rate spring between the screw member and the support member resiliently transmitting brake applying forces between the shoes to change the vibration frequency of the brake shoes as the brake applying forces increase.

5. A brake comprising a drum and shoes engageable therewith and having applying means at one end of the shoes and adjustable connecting means between opposite ends of the shoes, said adjustable connecting means having a first support member engaging one of the shoes, a second support member engaging the other shoe, and a spring between the support members having a changeable spring rate increasing as the brake applying force increases to change the vibration frequency of the brake shoes as the brake applying forces increase.

6. A brake comprising a drum and shoes engageable therewith and having applying means at one end of the shoes and adjustable connecting means between the opposite ends of the shoes, said adjustable connecting means having a first support member engaging one of the shoes, a second support member engaging the other shoe, and a spring ring between the support members, said spring ring engaging one of the support members at the outer periphery of the spring ring and engaging the other of the support members at the inner periphery of the spring ring and deflected axially on movement of the support members toward or away from each other, at least one of the support members having the face thereof engaged by the spring ring shaped with a contour effecting a change in the radius of the engagement of the spring ring with the said face to effect a change in the spring rate of the spring ring and thereby change the vibration frequency of the shoes in proportion to the brake applying force.

7. A brake comprising a drum and shoes engageable therewith and having applying means at one end of the shoes and adjustable connecting means between the opposite ends of the shoes, said adjustable connecting means having a first support member engaging one of the shoes, a second support member engaging the other shoe, and a spring ring between the support members, said spring ring engaging one of the support members at the outer periphery of the spring ring and engaging the other of the support members at the inner periphery of the spring ring and deflected axially on movement of the support members toward or away from each other, at least one of the support members having the face thereof engaged by the spring ring shaped with a contour effecting a change in the radius of engagement of the spring ring with the said face to effect an increase of the spring rate of the spring ring and thereby increase the vibration frequency of the shoes in proportion to increase of brake applying force.

8. A brake comprising a drum and shoes engageable therewith and having applying means at one end of the shoes and adjustable connecting means between the shoes, having a first support member engaging one of the shoes and a second support member engaging the other shoe with a flat spring ring between the support members having a changeable spring rate that changes with increasing brake applying pressure to change the vibration frequency of the brake shoes as the brake applying pressure increases.

9. A brake comprising a drum and shoes engageable therewith and having applying means at one end of the shoes and adjustable connecting means between the opposite ends of the shoes, said adjustable connecting means having a first support member engaging one of the shoes, a second support member engaging the other shoe, and a spring ring between the support members, said spring ring engaging one of the support members at the outer periphery of the spring ring and engaging the other of the support members at the inner periphery of the spring ring and deflected axially on movement of the support members toward or away from each other, at least one of the support members having the face thereof engaged by the spring ring recessed from the face of the spring ring to provide for a decreased radius of engagement of the spring ring with the said face on deflection of the spring ring as a result of brake applying force to effect thereby an increase of the spring rate of the spring ring and thereby increase the vibration frequency of the shoes in proportion to increase in brake applying force.

10. A brake comprising a drum and shoes engageable therewith and having applying means at one end of the shoes and adjustable connecting means between the opposite ends of the shoes, said adjustable connecting means having a first support member engaging one of the shoes, a second support member engaging the other shoe, and a spring ring between the support members, said spring ring engaging one of the support members at the outer periphery of the spring ring and engaging the other of the support members at the inner periphery of the spring ring and deflected axially on movement of the support members toward or away from each other, at least one of the support members having the face thereof engaged by the spring ring recessed from the face of the spring ring to provide for a decreased radius of engagement of the spring ring with the said face on deflection of the spring ring as a result of brake applying force to effect thereby an increase of the spring rate of the spring ring and thereby increase the vibration frequency of the shoes in proportion to increase in brake applying force, said recess also providing stop means for said spring ring to limit maximum deflection thereof and provide thereby a rigid connection between the support members for transfer of brake applying force between the shoes.

No references cited.